United States Patent
Wang et al.

(10) Patent No.: US 10,757,537 B2
(45) Date of Patent: Aug. 25, 2020

(54) USER POSITIONING METHOD, INFORMATION PUSH METHOD, AND RELATED APPARATUS

(71) Applicant: ALIBABA GROUP HOLDING LIMITED, Grand Cayman (KY)

(72) Inventors: Nan Wang, Hangzhou (CN); Zhijun Du, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 0 days.

(21) Appl. No.: 16/284,724

(22) Filed: Feb. 25, 2019

(65) Prior Publication Data

US 2019/0191276 A1 Jun. 20, 2019

Related U.S. Application Data

(63) Continuation of application No. PCT/CN2017/097956, filed on Aug. 18, 2017.

(30) Foreign Application Priority Data

Aug. 31, 2016 (CN) .......................... 2016 1 0799696

(51) Int. Cl.
*H04W 4/02* (2018.01)
*G10L 19/018* (2013.01)
(Continued)

(52) U.S. Cl.
CPC .............. *H04W 4/025* (2013.01); *G01S 15/74* (2013.01); *G10L 19/018* (2013.01);
(Continued)

(58) Field of Classification Search
None
See application file for complete search history.

(56) References Cited

U.S. PATENT DOCUMENTS 6,411,725 B1 * 6/2002 Rhoads ................. G10L 19/018
382/100
9,269,022 B2 2/2016 Rhoads et al.
(Continued)

FOREIGN PATENT DOCUMENTS

CN 101115124 A 1/2008
CN 102385862 A 3/2012
(Continued)

OTHER PUBLICATIONS

First Office Action and First Search for Chinese Application No. 201610799696.8 dated Mar. 1, 2019 with English machine translation (16 pages).

(Continued)

*Primary Examiner* — Anh Vu H Ly
(74) *Attorney, Agent, or Firm* — Sheppard Mullin Richter & Hampton LLP

(57) ABSTRACT

Methods, systems, and apparatus, including computer programs encoded on computer storage media, for locating a client terminal are provided. One of the methods includes: obtaining, by an audio signal playing terminal, identification information of an object associated with the audio signal playing terminal; watermarking, by the audio signal playing terminal, a to-be-played audio signal based on the identification information to obtain an audio signal having a watermark; and playing, by the audio signal playing terminal, the audio signal having the watermark for a client terminal to collect the audio signal having the watermark and send the audio signal having the watermark or the identification information to a server to enable the server to obtain the identification information and determine a position of the object based on a correspondence between the identification information and the position of the object and thereby to determine a position of the client terminal.

18 Claims, 8 Drawing Sheets

(51) Int. Cl.
*H04L 29/08* (2006.01)
*H04W 4/029* (2018.01)
*G01S 15/74* (2006.01)
*G11B 20/00* (2006.01)
*H04W 64/00* (2009.01)

(52) U.S. Cl.
CPC ........ *G11B 20/00891* (2013.01); *H04L 29/08* (2013.01); *H04W 4/029* (2018.02); *H04W 64/006* (2013.01)

(56) References Cited

U.S. PATENT DOCUMENTS

| | | | |
|---|---|---|---|
| 9,305,559 | B2 | 4/2016 | Sharma et al. |
| 9,595,059 | B2 | 3/2017 | Knudson et al. |
| 2004/0153649 | A1* | 8/2004 | Rhoads .............. H04N 1/32203 713/176 |
| 2005/0076219 | A1 | 4/2005 | De Bot |
| 2007/0174059 | A1 | 7/2007 | Rhoads et al. |
| 2007/0208805 | A1* | 9/2007 | Rhoads .................. G06Q 30/06 709/203 |
| 2008/0027734 | A1 | 1/2008 | Zhao et al. |
| 2008/0049704 | A1* | 2/2008 | Witteman .............. H04H 60/58 370/342 |
| 2008/0051029 | A1* | 2/2008 | Witteman .............. G11B 27/28 455/17 |
| 2008/0066098 | A1* | 3/2008 | Witteman .............. G06Q 30/02 725/34 |
| 2008/0228578 | A1* | 9/2008 | Mashinsky ............. G06F 21/10 705/14.54 |
| 2008/0262928 | A1* | 10/2008 | Michaelis .............. G06Q 30/02 705/14.26 |
| 2009/0304182 | A1 | 12/2009 | Choi et al. |
| 2010/0322035 | A1 | 12/2010 | Rhoads et al. |
| 2011/0238192 | A1* | 9/2011 | Shah ...................... G10L 19/018 700/94 |
| 2012/0134548 | A1 | 5/2012 | Rhoads et al. |
| 2012/0214515 | A1 | 8/2012 | Davis et al. |
| 2013/0114848 | A1 | 5/2013 | Petrovic et al. |
| 2013/0204415 | A1* | 8/2013 | Fregley .................. G06Q 30/02 700/94 |
| 2014/0006025 | A1* | 1/2014 | Krishnan ................ G10L 17/00 704/246 |
| 2014/0142958 | A1* | 5/2014 | Sharma ................. G10L 19/018 704/500 |
| 2014/0222438 | A1 | 8/2014 | Courtney, III et al. |
| 2014/0250479 | A1* | 9/2014 | Lee .......................... H04N 7/08 725/110 |
| 2014/0324591 | A1* | 10/2014 | Kim ...................... H04W 12/06 705/14.58 |
| 2015/0163528 | A1 | 6/2015 | An et al. |
| 2015/0221316 | A1* | 8/2015 | Mufti .................... G06F 16/683 700/94 |
| 2015/0373468 | A1 | 12/2015 | Shayandeh et al. |
| 2015/0380003 | A1* | 12/2015 | Davis ....................... G01S 5/22 700/94 |
| 2016/0171486 | A1 | 6/2016 | Wagner et al. |
| 2016/0204880 | A1 | 7/2016 | Endo et al. |
| 2016/0226990 | A1* | 8/2016 | Brandstetter ...... G06Q 30/0261 |
| 2016/0353124 | A1 | 12/2016 | Gish et al. |
| 2017/0250882 | A1* | 8/2017 | Kellicker ................ H04L 43/08 |
| 2019/0191276 | A1 | 6/2019 | Wang et al. |
| 2019/0302222 | A1 | 10/2019 | Bradley et al. |

FOREIGN PATENT DOCUMENTS

| | | |
|---|---|---|
| CN | 102457332 A | 5/2012 |
| CN | 202949571 U | 5/2013 |
| CN | 103503503 A | 1/2014 |
| CN | 103869277 A | 6/2014 |
| CN | 104683947 A | 6/2015 |
| CN | 105190659 A | 12/2015 |
| CN | 105392022 A | 3/2016 |
| CN | 105490926 A | 4/2016 |
| CN | 103503503 B | 6/2017 |
| CN | 106921728 A | 7/2017 |
| CN | 107113475 A | 8/2017 |
| CN | 103975605 B | 9/2018 |
| CN | 105075280 B | 1/2019 |
| EP | 3203380 A1 | 8/2017 |
| JP | 2005-522058 A | 7/2005 |
| JP | 2013-200629 A | 10/2013 |
| JP | 2014505896 A | 3/2014 |
| JP | 2014168167 A | 9/2014 |
| JP | 2015-41928 A | 3/2015 |
| JP | 2017-528687 A | 9/2017 |
| TW | 201528183 A | 7/2015 |
| WO | 2008038852 A1 | 4/2008 |

OTHER PUBLICATIONS

Written Opinion of the International Searching Authority and International Search Report for PCT Application No. PCT/CN2017/097956 dated Nov. 8, 2017 (14 pages).

Non-final rejection and Search Report for Taiwanese Application No. 106120046 dated Jul. 4, 2018 (15 pages).

International Preliminary Report on Patentability Chapter I for PCT Application No. PCT/CN2017/097956 dated Mar. 14, 2019 (12 pages).

Search Report for European Application No. 17845249.6 dated Jan. 17, 2020.

"Dongle for TV Location Identification and Advertisement Insertion," IP.com Journal, IP.com Inc., May 15, 2014.

Office Action for Japanese Application No. 2019-511739 dated Jun. 16, 2020.

* cited by examiner

US 10,757,537 B2

USER POSITIONING METHOD, INFORMATION PUSH METHOD, AND RELATED APPARATUS

CROSS-REFERENCE TO RELATED APPLICATIONS

This application is a continuation application of International Patent Application No. PCT/CN2017/097956, filed on Aug. 18, 2017, which is based on and claims priority to Chinese Patent Application No. 201610799696.8, filed on Aug. 31, 2016, and entitled "USER POSITIONING METHOD, INFORMATION PUSH METHOD, AND RELATED APPARATUS." The above-referenced applications are incorporated herein by reference in their entirety.

TECHNICAL FIELD

This application relates to the field of Internet technologies, and in particular, to a user positioning method, an information push method, and a related apparatus.

BACKGROUND

At present, in an interaction process between a server and a user, the area where the user is usually cannot be accurately located. As a result, the server cannot more precisely interact with the user. For example, when the user is located in a market covering a relatively wide area (for example, having a plurality of independent stores), the server usually can only determine that the user is in the market, but cannot more precisely determine in which area (that is, a store) in the market the user is located, leading to an inaccurate positioning result.

To resolve the foregoing problem, currently, a user can be located by disposing a plurality of Bluetooth apparatuses in a specified area. For example, for a market covering a relatively wide area (for example, having a plurality of independent stores), each store in the market can be provided with a Bluetooth apparatus, and the user may enable a Bluetooth function of a terminal device associated with the user and scan Bluetooth apparatuses near a position at which the user is located, to implement accurate positioning of the position at which the user is located.

However, each time the user is located in the foregoing manner, the user needs to enable the Bluetooth function of the terminal device associated with the user, making an operation chain of the user relatively long and positioning efficiency relatively low, and leading to relatively poor user experience. In addition, in the foregoing positioning manner, a significant amount of Bluetooth apparatuses need to be disposed in the specified area, so that the costs of the Bluetooth apparatuses are relatively high, increasing positioning costs. Furthermore, if the Bluetooth function of the terminal device associated with the user is not disabled after being enabled for a long time, a waste of terminal power is caused, further increasing the positioning costs and lowering the user experience.

That is, the existing user positioning manner has problems such as relatively low positioning efficiency and relatively high positioning costs.

SUMMARY

Embodiments of the specification provide a user positioning method, an information push method, and a related apparatus, to resolve problems of an existing user positioning manner such as relatively low positioning efficiency and relatively high positioning costs.

According to an aspect, an embodiment of specification provides a user positioning method, comprising:

obtaining, by an audio signal playing terminal, identification information of an object associated with the audio signal playing terminal;

watermarking, by the audio signal playing terminal, a to-be-played audio signal based on the identification information to obtain an audio signal having a watermark; and playing, by the audio signal playing terminal, the audio signal having the watermark for a client terminal to collect the audio signal having the watermark and send the audio signal having the watermark or the identification information to a server to enable the server to obtain the identification information and determine a position of the object based on a correspondence between the identification information and the position of the object and thereby to determine a position of the client terminal.

In some embodiments, playing, by the audio signal playing terminal, the audio signal having the watermark for a client terminal to collect the audio signal having the watermark and send the audio signal having the watermark or the identification information to a server to enable the server to obtain the identification information and determine a position of the object based on a correspondence between the identification information and the position of the object and thereby to determine a position of the client terminal comprises: playing, by the audio signal playing terminal, the audio signal having the watermark for the client terminal to collect the audio signal having the watermark and send the audio signal having the watermark to the server to enable the server to parse the audio signal to obtain the identification information and determine the position of the object based on the correspondence between the identification information and the position of the object and thereby to determine the position of the client terminal.

In other embodiments, playing, by the audio signal playing terminal, the audio signal having the watermark for a client terminal to collect the audio signal having the watermark and send the audio signal having the watermark or the identification information to a server to enable the server to obtain the identification information and determine a position of the object based on a correspondence between the identification information and the position of the object and thereby to determine a position of the client terminal comprises: playing, by the audio signal playing terminal, the audio signal having the watermark for the client terminal to collect the audio signal having the watermark and parse the audio signal having the watermark to obtain the identification information, and send the identification information to the server to enable the server to obtain the identification information and determine the position of the object based on the correspondence between the identification information and the position of the object and thereby to determine the position of the client terminal.

In yet other embodiments, the obtaining, by an audio signal playing terminal, identification information of an object associated with the audio signal playing terminal comprises: sending, by the audio signal playing terminal, an identification information obtaining request to the server; and receiving the identification information that is allocated to the object associated with the audio signal playing terminal by the server in response to the identification information obtaining request.

In still other embodiments, the sending an identification information obtaining request is triggered by receiving, by the audio signal playing terminal, an information obtaining triggering instruction from the object associated with the audio signal playing terminal.

In other embodiments, the sending an identification information obtaining request is triggered by determining, by the audio signal playing terminal, a change of a position of the audio signal playing terminal.

In yet other embodiments, the identification information obtaining request includes identity information of the object associated with the audio signal playing terminal.

In still other embodiments, the watermarking, by the audio signal playing terminal, a to-be-played audio signal based on the identification information to obtain an audio signal having a watermark comprises: sending, by the audio signal playing terminal, the to-be-played audio signal to a watermarking apparatus for the watermarking apparatus to watermark the to-be-played audio signal based on the identification information to obtain the audio signal having the watermark. In some embodiments, the server includes the watermarking apparatus.

According to another aspect, an embodiment of the specification provides a user positioning method, comprising:

collecting, by a client terminal, an audio signal having a watermark from an audio signal playing terminal, wherein the watermark indicates identification information of an object associated with the audio signal playing terminal; and parsing, by the client terminal, the audio signal to obtain the identification information indicated by the watermark, and sending the identification information to a server, for the server to determine a position of the object based on the identification information and thereby to determine a position of the client terminal; or sending, by the client terminal, the collected audio signal having the watermark to a server, for the server to parse the audio signal to obtain the identification information indicated by the watermark and determine a position of the object based on the identification information and thereby to determine a position of the client terminal.

In some embodiments, the position of the object is determined based on a correspondence between the identification information and the position of the object.

In other embodiments, the method further comprises: receiving push information associated with the position of the client terminal from the server.

In still other embodiments, the push information includes one or more of coupon information and discount information.

According to still another aspect, an embodiment of the specification provides a user positioning method, comprising:

receiving, by a server, identification information from a client terminal, where the identification information is obtained by the client terminal by parsing an audio signal having a watermark and played by an audio signal playing terminal, and the identification information is identification information of an object associated with the audio signal playing terminal; and locating, by the server, a position of the client terminal based on the received identification information and a stored correspondence between the identification information and a position of the object.

According to yet another aspect, an embodiment of the specification provides yet another user positioning method, comprising:

receiving, by a server, an audio signal having a watermark from a client terminal, where the watermark is used to indicate identification information of an object associated with an audio signal playing terminal;

parsing, by the server, the audio signal to obtain the identification information indicated by the watermark; and locating a position of the client terminal based on the identification information and a stored correspondence between the identification information and a position of the object.

According to another aspect, an embodiment of the specification further provides an information push method, comprising:

locating a client terminal by using any one of the foregoing user positioning methods, and sending push information associated with the position of the client terminal to the client terminal after a position of the client terminal is located.

According to another aspect, an embodiment of the specification further provides an audio signal playing terminal, comprising: one or more processors and one or more non-transitory computer-readable memories coupled to the one or more processors and configured with instructions executable by the one or more processors to cause the terminal to perform operations comprising:

obtaining identification information of an object associated with the audio signal playing terminal;

watermarking a to-be-played audio signal based on the identification information, to obtain an audio signal having a watermark; and playing, by the audio signal playing terminal, the audio signal having the watermark for a client terminal to collect the audio signal having the watermark and send the audio signal having the watermark or the identification information to a server to enable the server to obtain the identification information and determine a position of the object based on a correspondence between the identification information and the position of the object and thereby to determine a position of the client terminal.

According to still another aspect, an embodiment of the specification further provides a client terminal, comprising: one or more processors and one or more non-transitory computer-readable memories coupled to the one or more processors and configured with instructions executable by the one or more processors to cause the terminal to perform operations comprising:

collecting, by a client terminal, an audio signal having a watermark from an audio signal playing terminal, wherein the watermark indicates identification information of an object associated with the audio signal playing terminal; and parsing, by the client terminal, the audio signal to obtain the identification information indicated by the watermark, and sending the identification information to a server, for the server to determine a position of the object based on the identification information and thereby to determine a position of the client terminal; or sending, by the client terminal, the collected audio signal having the watermark to a server, for the server to parse the audio signal to obtain the identification information indicated by the watermark and determine a position of the object based on the identification information and thereby to determine a position of the client terminal.

According to another aspect, an embodiment of the specification further provides a server, comprising: one or more processors and one or more non-transitory computer-readable memories coupled to the one or more processors and configured with instructions executable by the one or more processors to cause the server to perform operations comprising:

receiving identification information from a client terminal, where the identification information is obtained by the client terminal by parsing an audio signal having a watermark and played by an audio signal playing terminal, and the identification information is identification information of an object associated with the audio signal playing terminal; and locating, based on the received identification information and a stored correspondence between the identification information of the object and a position of the object, a position of the client terminal.

According to still another aspect, an embodiment of the specification further provides another server, comprising: one or more processors and one or more non-transitory computer-readable memories coupled to the one or more processors and configured with instructions executable by the one or more processors to cause the server to perform operations comprising:

receiving an audio signal having a watermark from a client terminal, wherein the watermark indicates identification information of an object, and wherein the audio signal is obtained by the client terminal from an audio signal playing terminal associated with the object;

parsing the audio signal to obtain the identification information indicated by the watermark; and determining a position of the object based on the obtained identification information; and determining a position of the client terminal based on the position of the object.

In some embodiments, the operations further comprise: sending push information associated with the position of the client terminal to the client terminal after the position of the client terminal is determined.

In other embodiments, the push information includes one or more of coupon information and discount information of the object.

In still other embodiments, the server stores correspondence between identification information and positions of objects.

In yet other embodiments, determining a position of the object based on the obtained identification information further comprises: determining the position of the object based on the stored correspondence between identification information and positions of objects.

In other embodiments, the operations further comprise: receiving an identification information obtaining request from the audio signal playing terminal; and allocating the identification information to the object associated with the audio signal playing terminal in response to the identification information obtaining request.

According to another aspect, an embodiment of the specification further provides an information push apparatus, comprising: one or more processors and one or more non-transitory computer-readable memories coupled to the one or more processors and configured with instructions executable by the one or more processors to cause the apparatus to perform operations comprising:

locating a user by using any one of the foregoing user positioning methods; and sending push information of an object associated with an audio signal playing terminal to the client terminal after a position of the client terminal is located.

Beneficial effects of the specification are as follows:

The embodiments of the specification provide a user positioning method and an apparatus, to implement accurate positioning of a user by identifying an audio signal having a watermark and collected by a client terminal, and the user does not need to perform operations such as enabling a Bluetooth function of a terminal device associated with the user and scanning a Bluetooth apparatus near a position at which the user is located, thereby improving user positioning efficiency while reducing user positioning costs. In addition, the embodiments of the specification further provide an information push method and an apparatus.

BRIEF DESCRIPTION OF THE DRAWINGS

To describe the technical solutions in the embodiments of the specification more clearly, the following briefly describes the accompanying drawings required for describing the embodiments. Apparently, the accompanying drawings in the following description show merely some embodiments of the specification, and persons of ordinary skill in the art may still derive other drawings from these accompanying drawings without creative efforts.

DETAILED DESCRIPTION OF THE INVENTION

To make the objectives, technical solutions, and advantages of the specification clearer, the following further describes the specification in detail with reference to the accompanying drawings. Apparently, the described embodiments are merely some rather than all of the embodiments of the specification. All other embodiments obtained by persons of ordinary skill in the art based on the embodiments of the specification without creative efforts shall fall within the protection scope of the specification.

Embodiment 1

Figure 1:
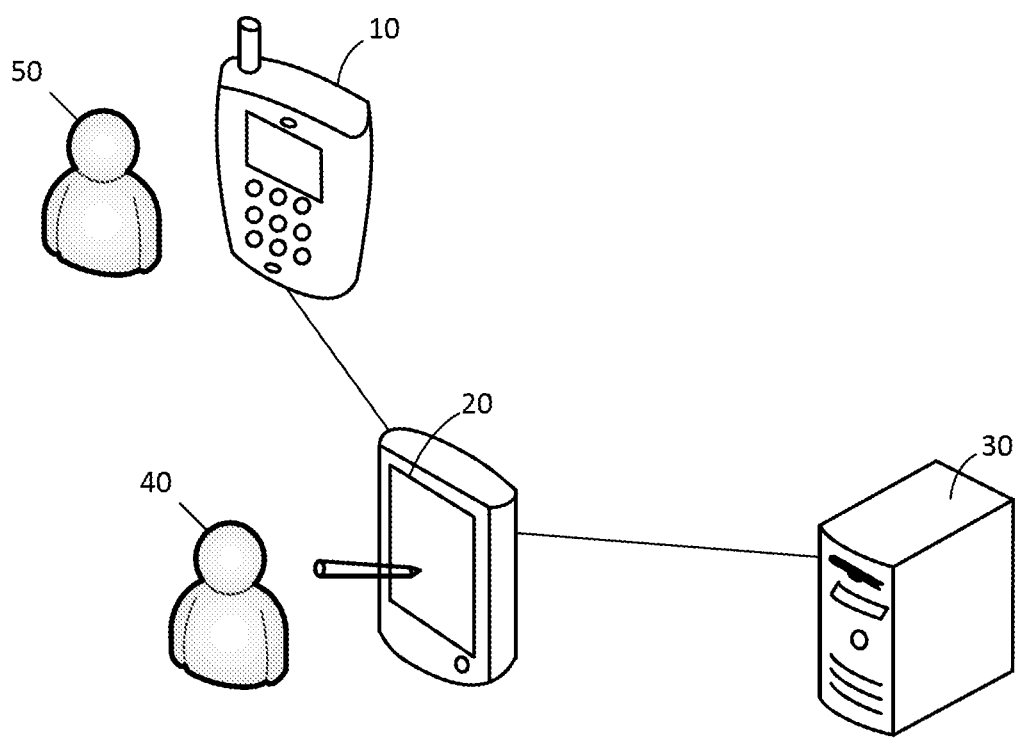
FIG. 1 is a schematic diagram of a possible application scenario of a user positioning method according to an embodiment of the specification.

To resolve problems of existing user positioning manners such as relatively low positioning efficiency and relatively high positioning costs, Embodiment 1 of the specification provides a user positioning method. As shown in FIG. 1, FIG. 1 is a schematic diagram of a possible application scenario of the user positioning method. The scenario may include, for example, an audio signal playing terminal 10, a client terminal installed in a user terminal 20 (such as a mobile phone, a tablet computer, or a notebook computer), and a server 30.

Positioning of a user 40 in a market (where, for example, includes a plurality of independent stores) is used as an example. Sellers 50 in the market may be assigned with identification information. The assigned identification information of the sellers 50 may correspond to the audio signal playing terminal 10 (that is, identification information of an object (i.e., seller) associated with the audio signal playing terminal 10). The audio signal playing terminal 10 may perform watermarking on a to-be-played audio signal based on the identification information, to obtain an audio signal having a watermark, and play the audio signal having a watermark, for example, play the audio signal having the watermark at a position of the object (for example, a store of the seller 50).

Correspondingly, the user 40 may collect the audio signal having the watermark using the user 40's client terminal, and send the collected audio signal having the watermark to the server 30. The server 30 parses the audio signal to obtain the identification information indicated by the watermark, and locates, based on the identification information and a stored correspondence between the identification information of the object and the position of the object, a position of the user 40 associated with the client terminal. For example, the server 30 locates the position of the store of the seller 50 where the user 40 that corresponds to the client terminal is (where the position of the store herein includes a position in the store or a position near the store).

Alternatively, after collecting the audio signal having the watermark, the client terminal 20 of the user 40 may parse the audio signal to obtain identification information indicated by the watermark, and then send the identification information to the server 30. The server 30 locates, based on the identification information and a stored correspondence between the identification information of the object and the position of the object, a position of the user 40 associated with the client terminal.

In some embodiments, the positions of the objects (the sellers) may usually be represented by using latitudes and longitudes.

In addition, after locating, based on the identification information sent by the client terminal or based on the identification information indicated by the watermark and obtained through parsing, the position of the user 40 associated with the client terminal, the server 30 may further send push information of the object associated with the audio signal playing terminal 10 to the user 40, for example, coupon information and discount information of the seller 50.

In other words, in this embodiment of the specification, accurate positioning of a user may be implemented by identifying an audio signal having a watermark and collected by a client terminal, and the user does not need to perform operations such as enabling a Bluetooth function of a terminal device associated with the user and scanning a Bluetooth apparatus near a position at which the user is located, thereby improving user positioning efficiency while reducing user positioning costs. In addition, after the position of the user associated with the client terminal is located, the push information of the object associated with the audio signal playing terminal may further be sent to the user to implement targeted information push, so that information push accuracy can further be improved.

In addition, the audio signal playing terminal 10 is a terminal that can play an audio signal (such as broadcast, music, etc.) at a position of the object associated with the audio signal playing terminal 10, for example, a terminal such as a mobile phone or a tablet computer in which audio playing software is installed or to which a corresponding external audio playing apparatus is connected. The client terminal can be any of various client terminals capable of collecting ambient audio signals. The server 30 can be any of various platforms capable of locating a user and/or pushing information. This is not limited.

Figure 2:
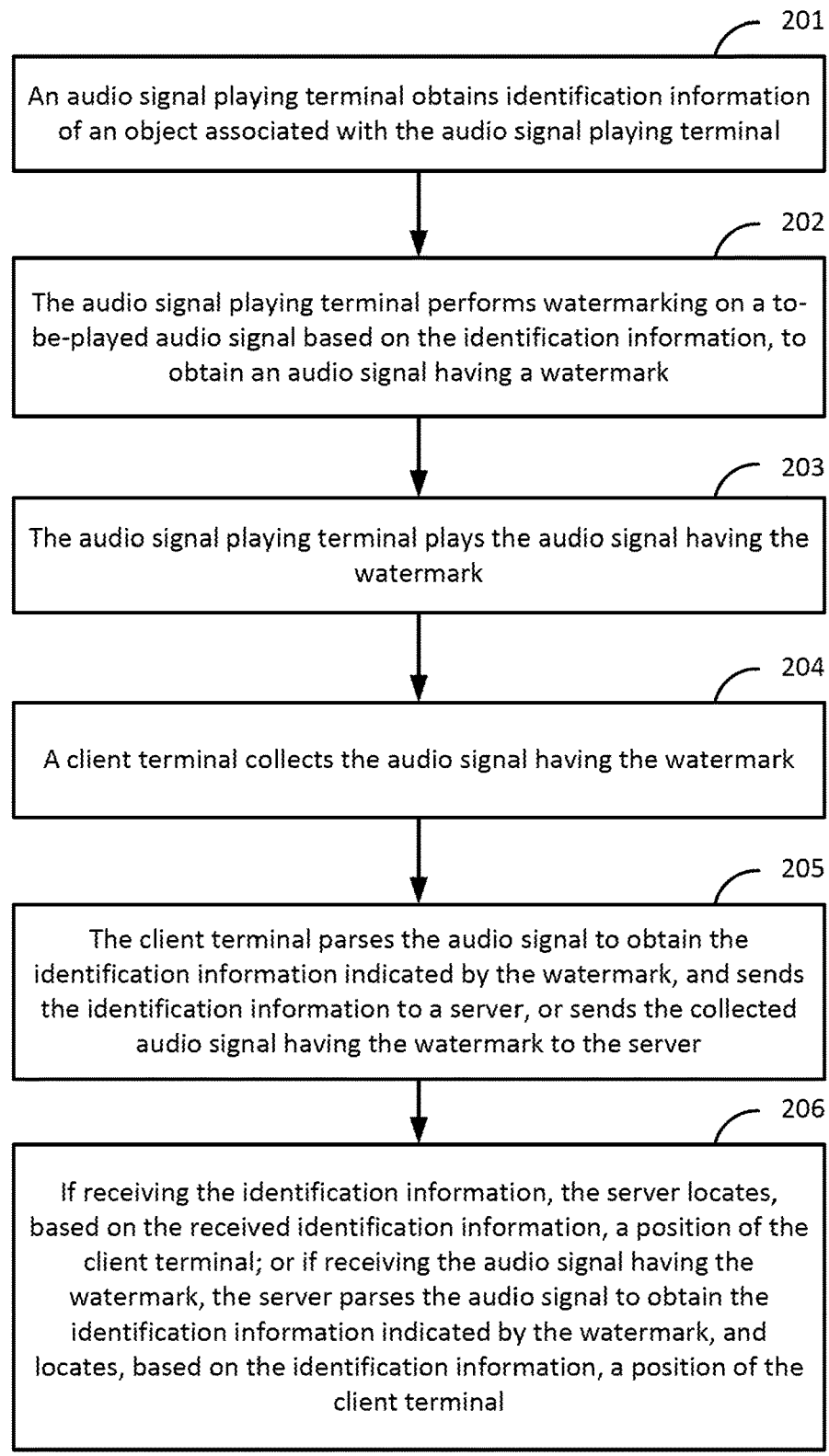
FIG. 2 is a schematic flowchart of a user positioning method according to one embodiment of the specification.

The following exemplarily describes the user positioning method in Embodiment 1 of the specification with reference to FIG. 2 and in combination with the application scenario shown in FIG. 1. The foregoing application scenario is illustrated merely for ease of understanding of the spirits and principles of the specification, and implementations of this application are not limited in this aspect. On the contrary, the implementations of the specification can be applied to any applicable scenario.

As shown in FIG. 2, FIG. 2 is a possible schematic flowchart of the user positioning method according to Embodiment 1 of the specification. The user positioning method may include the following steps.

Step 201. An audio signal playing terminal obtains identification information of an object associated with the audio signal playing terminal.

The audio signal playing terminal may obtain the identification information of the object associated with the audio signal playing terminal in the following manner:

sending an identification information obtaining request to a server; and receiving unique identification information that is allocated to the object associated with the audio signal playing terminal by the server based on the identification information obtaining request.

The identification information of the object associated with the audio signal playing terminal may be an Internet Protocol (IP) address, a Media Access Control (MAC) address, an International Mobile Equipment Identity (IMEI) number, or the like, of the audio signal playing terminal; or may further be any information such as a digit or a character that is different from identification information allocated to another object. This is not limited.

For example, after receiving the identification information obtaining requests sent by the audio signal playing terminals, based on an actual condition, for example, a sequence of receiving the identification information obtaining requests, the server may allocate digits such as 1, 2, . . . , or N that are different from each other to the objects associated with the audio signal playing terminals, as the identification information of the objects associated with the audio signal playing terminals.

In addition, the server stores a correspondence between the identification information of the object and a position of the object, so that after identification information in an ambient audio signal of a client terminal is identified subsequently, a position of a user associated with the client terminal may be located directly based on the correspondence.

In addition, optionally, the identification information obtaining request may be sent by the audio signal playing terminal to the server according to an information obtaining triggering instruction delivered by the object associated with the audio signal playing terminal, or may be sent initiatively by the audio signal playing terminal to the server when determining that the position of the audio signal playing terminal changes, for example, moves from one area to another area. This is not limited.

Further, for ease of allocating identification information by the server to the objects associated with the audio signal playing terminals, the identification information obtaining request may carry identity information of the object associated with the audio signal playing terminal. Positioning of a user in a market covering a relatively large area is used as an example. The identification information obtaining request may carry identity information of a seller. In this way, after receiving the identification information obtaining request, the server may allocate the identification information to the object associated with the audio signal playing terminal based on the identity information of the seller and carried in the information obtaining request.

The identification information obtaining request may usually carry information related to an initiator (that is, the audio signal playing terminal), and therefore, if the server stores a correspondence between the information related to the audio signal playing terminal and the object, the identification information obtaining request may not carry the identity information of the object associated with the audio signal playing terminal. In this case, after receiving the information obtaining request, the server may allocate identification information to an object associated with the initiator of the information obtaining request based on the information related the initiator of the information obtaining request.

In addition, during an activity operation period such as sales promotion, the seller may send push information (such as coupon information and discount information) to the server, for the server to establish a correspondence between push information of the object and the object, so that after locating a position of the user (the position herein may be understood as a store in which the user is located), the server may send the push information of the object associated with the audio signal playing terminal to the user based on the correspondence.

Step 202. The audio signal playing terminal performs watermarking on a to-be-played audio signal based on the identification information, to obtain an audio signal having a watermark.

The audio signal playing terminal may perform the watermarking on the to-be-played audio signal in the following manner, to obtain the audio signal having the watermark:

sending the to-be-played audio signal to a watermarking apparatus, so that the watermarking apparatus performs the watermarking on the to-be-played audio signal based on the identification information, to obtain the audio signal having the watermark.

The watermarking apparatus may use an audio watermarking technique in the prior art, such as a discrete cosine transform (DCT) domain audio watermarking technique and a code division multiplexing digital audio watermarking technique, to perform the watermarking on the to-be-played audio signal of the audio signal playing terminal, to obtain the audio signal having the watermark.

In addition, the watermarking apparatus may be the foregoing server previously allocating the identification information to the object of the audio signal playing terminal. In this way, when performing the watermarking on the to-be-played audio signal of the audio signal playing terminal, the watermarking apparatus does not need to obtain the identification information of the object associated with the audio signal playing terminal again, thereby reducing a quantity of times of information interaction and improving information processing efficiency.

Further, the watermarking apparatus may further be a specially-disposed apparatus configured to perform the watermarking, for example, may be a dedicated watermarking apparatus that is initialized based on the identification information of the object associated with the audio signal playing terminal. In this way, when the watermarking apparatus performs the watermarking on the to-be-played audio signal of the audio signal playing terminal, watermarking efficiency of the watermarking apparatus is higher than that of an apparatus such as the server.

Step 203. The audio signal playing terminal plays the audio signal having the watermark.

The audio signal playing terminal may play the audio signal having the watermark at the position of the object associated with the audio signal playing terminal using audio playing software disposed in the audio signal playing terminal or an external audio playing apparatus connected to the audio signal playing terminal.

In some embodiments, to enable the client terminal to receive the audio signal having the watermark near the object associated with the audio signal playing terminal as much as possible, the audio signal playing terminal can turn up the volume.

Step 204. A client terminal collects the audio signal having the watermark.

It can be learned from the foregoing steps that, the watermark in the audio signal having the watermark may be used to indicate the identification information of the object associated with the audio signal playing terminal.

In addition, the audio signal having the watermark and collected by the client terminal is usually a signal around a position at which the client terminal is located.

Step 205. The client terminal parses the audio signal to obtain the identification information indicated by the watermark, and sends the identification information to a server, or sends the collected audio signal having the watermark to the server.

That is, after collecting the audio signal having the watermark, the client terminal may directly send the audio signal having the watermark to the server, and the server parses the audio signal to obtain the identification information indicated by the watermark; or after parsing the audio signal having the watermark, the client terminal sends the identification information indicated by the watermark and obtained through parsing to the server.

If the audio signal having the watermark is parsed by the client terminal, a case can be avoided in which when there is a large quantity of client terminals simultaneously sending audio signals having watermarks to the server, the server needs to simultaneously parse a large quantity of audio signals having watermarks, thereby reducing processing resources of the server and alleviating working pressure of the server. In addition, if the audio signal having the watermark is parsed by the server instead of the client terminal, a requirement on the performance of the client terminal can be lowered, so that the method described in this embodiment of the specification can be more widely applied. In addition, for the client terminal, processing resources of the client terminal can be reduced, and working pressure of the client terminal can be alleviated. Therefore, during actual application, the client terminal may select any one of the foregoing parsing manners based on an actual need. This is not limited.

Optionally, that the audio signal having the watermark is parsed by the client terminal is used as an example. The client terminal may parse the audio signal based on an audio watermark identification technique, such as a system characteristic parameter extraction and identification technique and a dynamic time warping (DTW) online parallel algorithm identification technique, to obtain the identification information indicated by the watermark.

In addition, the client terminal may collect a plurality of audio signals having watermarks, and therefore before parsing the audio signals having the watermarks and collected by the client terminal, the client terminal or the server may first filter out audio signals whose signal strength is not higher than a preset strength threshold (the preset strength threshold may be flexibly set based on an actual condition) from all of the audio signals having the watermarks and collected by the client terminal. Alternatively, all audio signals except for one or more audio signals having the highest signal strength are filtered out from all the audio signals having the watermarks. The one or more audio signals having the highest signal strength are collected by the client terminal for subsequent parsing and processing.

Step 206. If receiving the identification information, the server locates, based on the received identification information, a position of a user associated with the client terminal; or if receiving the audio signal having the watermark, the server parses the audio signal to obtain the identification information indicated by the watermark, and locates, based on the identification information, a position of a user associated with the client terminal.

It can be learned from the foregoing steps that, the server may store the correspondence between the identification information of the object and the position of the object, and therefore after receiving the identification information sent by the client terminal, or after parsing the audio signal having the watermark and sent by the client terminal to obtain the identification information of the object associated with the audio signal playing terminal, the server may locate, based on the identification information and the stored correspondence between the identification information of the object and the position of the object. Because the client terminal is close to the audio signal playing terminal, which is associated with the object, the position of the client terminal is also determined. Thus, the position of the user associated with the client terminal is also determined.

For example, if the identification information received by the server or the identification information obtained through parsing is A, and it is learned based on the stored correspondence between the identification information of the object and the position of the object that the identification information A corresponds to a position 1, it can be obtained through positioning that the user associated with the client terminal is located at the position 1. In some embodiments, the server may parse the audio signal having the watermark by using the audio signal parsing manner described in step 205. This is not described again.

In addition, taking that the position of the user associated with the client terminal is located based on the received identification information as an example, if there is a plurality of received identification information, when the position of the user associated with the client terminal is located, identification information indicated by an audio signal having a watermark and having the strongest signal strength may be determined first in the plurality of identification information, and a position corresponding to the identification information is used as the position of the user associated with the client terminal; or an overlapped area of the positions corresponding to the plurality of identification information may be used as the position of the user associated with the client terminal.

Finally, in some embodiments, step 201 to step 203 independently form a procedure executed on the audio signal playing terminal side, step 204 to step 205 independently form a procedure executed on the client terminal side, and step 206 independently forms a procedure executed on the server side.

It can be learned from the foregoing descriptions that, in Embodiment 1 of the specification, accurate positioning of a user may be implemented by identifying an audio signal having a watermark and collected by a client terminal, and the user does not need to perform operations such as enabling a Bluetooth function of a terminal device associated with the user and scanning a Bluetooth apparatus near a position at which the user is located, thereby improving user positioning efficiency and user experience while reducing user positioning costs. For example, for a store in the market which can play an audio signal, access costs are low and operability is high; for a to-be-positioned user, the user does not need to perform any operation, thereby shortening an operation chain of the user and improving application awareness of the user.

Figure 3:
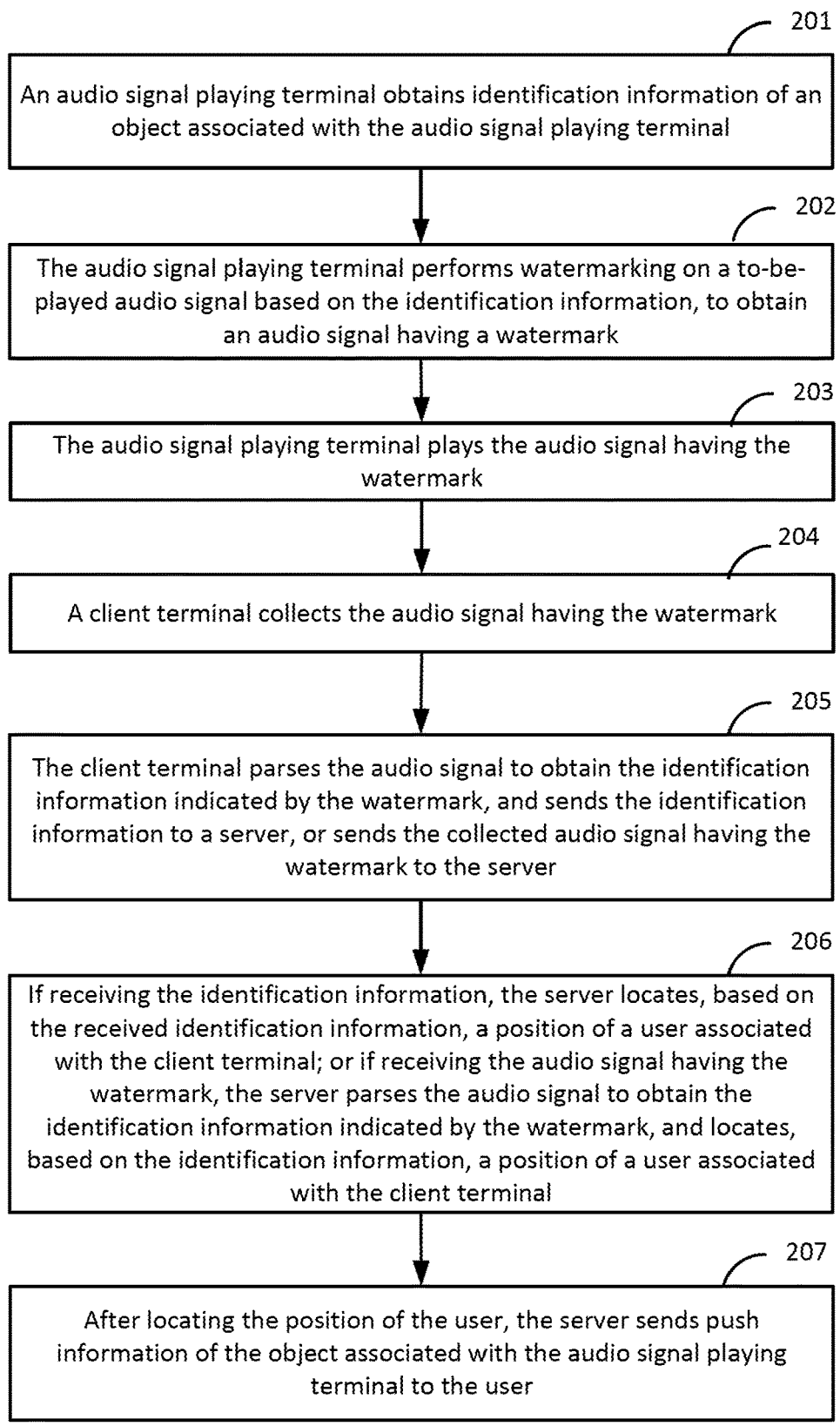
FIG. 3 is a schematic flowchart of an information push method according to one embodiment of the specification.

Further, as shown in FIG. 3, Embodiment 1 of the specification further provides an information push method. A possible application scenario of the information push method is still shown in FIG. 1. In addition, as shown in FIG. 3, the information push method may include step 201 to step 206 in Embodiment 1 of the specification. In addition, the information push method may further include the following step 207.

Step 207. After locating the position of the user, the server sends push information associated with the position of the user, e.g., push information for the object associated with the audio signal playing terminal, to the user.

In an information push application, the position of the user located in step 207 may be store information because the store information (for example, information about a discount activity) can be pushed to the user provided that a store in which the user is located or a store near the user is known.

In other words, in the solution of Embodiment 1 of the specification, after the position of the user associated with the client terminal is located, the push information of the object associated with the audio signal playing terminal may further be sent to the user, to implement targeted information push, so that information push accuracy can further be improved and user experience can be improved.

Embodiment 2

Figure 4:
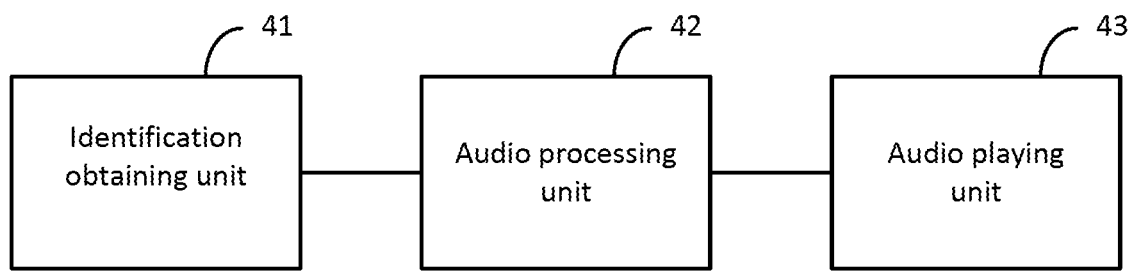
FIG. 4 is a schematic structural diagram of an audio signal playing terminal according to one embodiment of the specification.

Based on the same invention idea of the user positioning method in Embodiment 1, Embodiment 2 of the specification provides an audio signal playing terminal. For an implementation of the audio signal playing terminal, refer to the related descriptions in the method Embodiment 1. Same or similar contents are not described again. In some embodiments, as shown in FIG. 4, the audio signal playing terminal may include:

an identification obtaining unit 41, configured to obtain identification information of an object associated with the audio signal playing terminal;

an audio processing unit 42, configured to perform watermarking on a to-be-played audio signal based on the identification information, to obtain an audio signal having a watermark; and an audio playing unit 43, configured to: play the audio signal having the watermark, to enable a client terminal to collect the audio signal having the watermark and send the collected audio signal having the watermark to a server, to enable the server to locate, based on the audio signal having the watermark, a position of a user associated with the client terminal; or capable of being configured to: play the audio signal having the watermark, to enable a client terminal to collect the audio signal having the watermark and parse the audio signal to send obtained identification information indicated by the watermark to a server, to enable the server to locate, based on the identification information, a position of a user associated with the client terminal.

Optionally, the identification obtaining unit 41 may be configured to: send an identification information obtaining request to the server; and receive unique identification information that is allocated to the object associated with the audio signal playing terminal by the server based on the identification information obtaining request.

Optionally, the audio processing unit 42 may be configured to send the to-be-played audio signal to a watermarking apparatus, so that the watermarking apparatus performs the watermarking on the to-be-played audio signal based on the identification information, to obtain the audio signal having a watermark.

Figure 5:
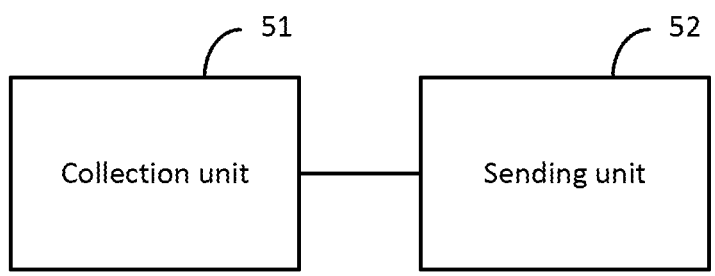
FIG. 5 is a schematic structural diagram of a client terminal according to one embodiment of the specification.

In addition, based on the same invention idea of the user positioning method in Embodiment 1, Embodiment 2 of the specification further provides a client terminal. For an implementation of the client terminal, refer to the related descriptions in the method Embodiment 1. The same or similar contents are not described again. In some embodiments, as shown in FIG. 5, the client terminal may include:

a collection unit 51, configured to collect an audio signal having a watermark, where the watermark is used to indicate identification information of an object associated with an audio signal playing terminal; and a sending unit 52, configured to: parse the audio signal to obtain the identification information indicated by the watermark, and send the identification information to a server, to enable the server to locate, based on the identification information, a position of a user associated with the client terminal; or send the collected audio signal having the watermark to a server, to enable the server to parse the audio signal to obtain the identification information indicated by the watermark and locate, based on the identification information, a position of a user associated with the client terminal, where the server stores a correspondence between the identification information of the object and a position of the object.

Figure 6:
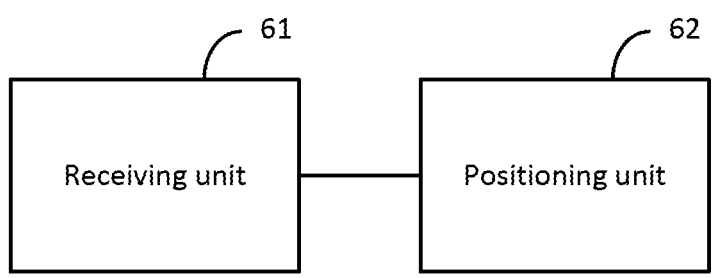
FIG. 6 is a schematic structural diagram of a server according to one embodiment of the specification.

Further, based on the same invention idea of the user positioning method in Embodiment 1, Embodiment 2 of the specification further provides a server. For an implementation of the server, refer to the related descriptions in the method Embodiment 1. The same or similar contents are not described again. In some embodiments, as shown in FIG. 6, the server may include:

a receiving unit 61, configured to receive identification information sent by a client terminal, where the identification information is obtained by the client terminal by parsing an audio signal having a watermark and played by an audio signal playing terminal, and the identification information is identification information of an object associated with the audio signal playing terminal; and a positioning unit 62, configured to locate, based on the received identification information and a stored correspondence between the identification information of the object and a position of the object, a position of a user associated with the client terminal.

Figure 7:
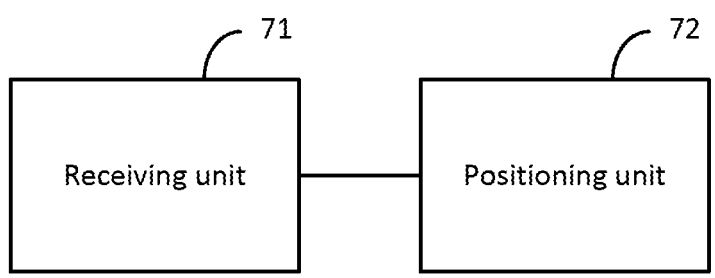
FIG. 7 is a schematic structural diagram of another server according to one embodiment of the specification.

Furthermore, based on the same invention idea of the user positioning method in Embodiment 1, Embodiment 2 of the specification further provides another server. For an implementation of the another server, refer to the related descriptions in the method Embodiment 1. The same or similar contents are not described again. In some embodiments, as shown in FIG. 7, the another server may include:

a receiving unit 71, configured to receive an audio signal having a watermark and sent by a client terminal, where the watermark is used to indicate identification information of an object associated with an audio signal playing terminal; and a positioning unit 72, configured to parse the audio signal to obtain the identification information indicated by the watermark, and locate, based on the identification information and a stored correspondence between the identification information of the object and a position of the object, a position of a user associated with the client terminal.

Figure 8:
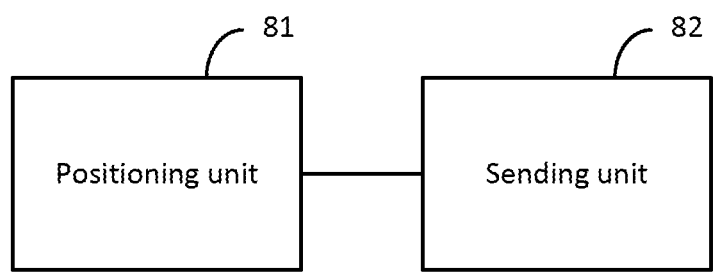
FIG. 8 is a schematic structural diagram of an information push apparatus according to one embodiment of the specification.

Furthermore, based on the same invention idea of the information push method in Embodiment 1, Embodiment 2 of the specification further provides an information push apparatus. For an implementation of the information push apparatus, refer to the related descriptions in the method Embodiment 1. The same or similar contents are not described again. In some embodiments, as shown in FIG. 8, the information push apparatus may include:

a positioning unit 81, configured to locate a user by using the user positioning method in Embodiment 1; and a sending unit 82, configured to send push information of an object associated with an audio signal playing terminal to the user after a position of the user is located.

The information push apparatus may usually be the server described in Embodiment 1. This is not described again.

Persons skilled in the art should understand that the embodiments of the specification may be provided as a method, an apparatus (a device), or a computer program product. Therefore, the invention may use a form of hardware only embodiments, software only embodiments, or embodiments with a combination of software and hardware. Moreover, the embodiments may be in a form of a computer program product that is implemented on one or more computer-usable storage media (including but not limited to a disk memory, a CD-ROM, an optical memory, and the like) that include computer-usable program code.

The embodiments are described with reference to flowcharts and/or block diagrams of the method, the apparatus (the device), and the computer program product in the specification. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the block diagrams.

These computer program instructions may also be stored in a computer-readable memory that can instruct the computer or the another programmable data processing apparatus to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto the computer or the another programmable data processing apparatus, so that a series of operations and steps are performed on the computer or the another programmable apparatus, thereby generating computer-implemented processing. Therefore, the instructions executed on the computer or the another programmable apparatus provide steps for implementing a specific function in one or more processes in the flowcharts and/or in one or more blocks in the block diagrams.

Although preferable embodiments of this application have been described, once persons skilled in the technology know a basic creative concept, they can make other changes and modifications to these embodiments. Therefore, the following claims are intended to be construed as to cover the embodiments and all changes and modifications falling within the scope of this application.

Apparently, persons skilled in the art can make various modifications and variations to this application without departing from the spirit and scope of this application. This application is intended to cover these modifications and variations provided that these modifications and variations fall within the scope of the claims of this application and their equivalent technologies.

What is claimed is:

1. A user positioning method, comprising:
    obtaining, by an audio signal playing terminal, identification information of an object associated with the audio signal playing terminal, by;
        sending, by the audio signal playing terminal, an identification information obtaining request to a server, and
        receiving the identification information that is allocated to the object associated with the audio signal playing terminal by the server in response to the identification information obtaining request;
    watermarking, by the audio signal playing terminal, a to-be-played audio signal based on the identification information to obtain an audio signal having a watermark; and
    playing, by the audio signal playing terminal, the audio signal having the watermark for a client terminal to collect the audio signal having the watermark and send the audio signal having the watermark or the identification information to the server to enable the server to obtain the identification information and determine a position of the object based on a correspondence between the identification information and the position of the object and thereby to determine a position of the client terminal.

2. The method according to claim 1, wherein the playing, by the audio signal playing terminal, the audio signal having the watermark for a client terminal to collect the audio signal having the watermark and send the audio signal having the watermark or the identification information to a server to enable the server to obtain the identification information and determine a position of the object based on a correspondence between the identification information and the position of the object and thereby to determine a position of the client terminal comprises:
    playing, by the audio signal playing terminal, the audio signal having the watermark for the client terminal to collect the audio signal having the watermark and send the audio signal having the watermark to the server to enable the server to parse the audio signal to obtain the identification information and determine the position of the object based on the correspondence between the identification information and the position of the object and thereby to determine the position of the client terminal.

3. The method according to claim 1, wherein the playing, by the audio signal playing terminal, the audio signal having the watermark for a client terminal to collect the audio signal having the watermark and send the audio signal having the watermark or the identification information to a server to enable the server to obtain the identification information and determine a position of the object based on a correspondence between the identification information and the position of the object and thereby to determine a position of the client terminal comprises:
    playing, by the audio signal playing terminal, the audio signal having the watermark for the client terminal to collect the audio signal having the watermark and parse the audio signal having the watermark to obtain the identification information, and send the identification information to the server to enable the server to obtain the identification information and determine the position of the object based on the correspondence between the identification information and the position of the object and thereby to determine the position of the client terminal.

4. The method according to claim 1, wherein the sending an identification information obtaining request is triggered by receiving, by the audio signal playing terminal, an information obtaining triggering instruction from the object associated with the audio signal playing terminal.

5. The method according to claim 1, wherein the sending an identification information obtaining request is triggered by determining, by the audio signal playing terminal, a change of a position of the audio signal playing terminal.

6. The method according to claim 1, wherein the identification information obtaining request includes identity information of the object associated with the audio signal playing terminal.

7. The method according to claim 1, wherein the watermarking, by the audio signal playing terminal, a to-be-played audio signal based on the identification information to obtain an audio signal having a watermark comprises:
    sending, by the audio signal playing terminal, the to-be-played audio signal to a watermarking apparatus for the watermarking apparatus to watermark the to-be-played audio signal based on the identification information to obtain the audio signal having the watermark.

8. The method according to claim 7, wherein the server includes the watermarking apparatus.

9. A server, comprising: one or more processors and one or more non-transitory computer-readable memories coupled to the one or more processors and configured with instructions executable by the one or more processors to cause the server to perform operations comprising:
    receiving an identification information obtaining request from an audio signal playing terminal associated with an object;
    allocating the identification information to the object associated with the audio signal playing terminal in response to the identification information obtaining request;
    receiving an audio signal having a watermark from a client terminal, wherein the watermark indicates the identification information of the object, and wherein the audio signal is obtained by the client terminal from the audio signal playing terminal associated with the object;
    parsing the audio signal to obtain the identification information indicated by the watermark;
    determining a position of the object based on the obtained identification information; and
    determining a position of the client terminal based on the position of the object.

10. The server according to claim 9, wherein the operations further comprise: sending push information associated with the position of the client terminal to the client terminal.

11. The server according to claim 10, wherein the push information includes one or more of coupon information and discount information.

12. The server according to claim 9, wherein the server stores correspondence between identification information and positions of objects.

13. The server according to claim 12, wherein the determining a position of the object based on the obtained identification information further comprises:
determining the position of the object based on the stored correspondence between identification information and positions of objects.

14. A audio signal playing terminal, comprising: one or more processors and one or more non-transitory computer-readable memories coupled to the one or more processors and configured with instructions executable by the one or more processors to cause the audio signal playing terminal to perform operations comprising:
obtaining, by the audio signal playing terminal, identification information of an object associated with the audio signal playing terminal, by;
sending, by the audio signal playing terminal, an identification information obtaining request to a server, and
receiving the identification information that is allocated to the object associated with the audio signal playing terminal by the server in response to the identification information obtaining request;
watermarking, by the audio signal playing terminal, a to-be-played audio signal based on the identification information to obtain an audio signal having a watermark; and
playing, by the audio signal playing terminal, the audio signal having the watermark for a client terminal to collect the audio signal having the watermark and send the audio signal having the watermark or the identification information to the server to enable the server to obtain the identification information and determine a position of the object based on a correspondence between the identification information and the position of the object and thereby to determine a position of the client terminal.

15. The audio signal playing terminal according to claim 14, wherein the playing, by the audio signal playing terminal, the audio signal having the watermark for a client terminal to collect the audio signal having the watermark and send the audio signal having the watermark or the identification information to a server to enable the server to obtain the identification information and determine a position of the object based on a correspondence between the identification information and the position of the object and thereby to determine a position of the client terminal comprises:
playing, by the audio signal playing terminal, the audio signal having the watermark for the client terminal to collect the audio signal having the watermark and send the audio signal having the watermark to the server to enable the server to parse the audio signal to obtain the identification information and determine the position of the object based on the correspondence between the identification information and the position of the object and thereby to determine the position of the client terminal.

16. The audio signal playing terminal according to claim 14, wherein the playing, by the audio signal playing terminal, the audio signal having the watermark for a client terminal to collect the audio signal having the watermark and send the audio signal having the watermark or the identification information to a server to enable the server to obtain the identification information and determine a position of the object based on a correspondence between the identification information and the position of the object and thereby to determine a position of the client terminal comprises:
playing, by the audio signal playing terminal, the audio signal having the watermark for the client terminal to collect the audio signal having the watermark and parse the audio signal having the watermark to obtain the identification information, and send the identification information to the server to enable the server to obtain the identification information and determine the position of the object based on the correspondence between the identification information and the position of the object and thereby to determine the position of the client terminal.

17. The audio signal playing terminal according to claim 14, wherein the sending an identification information obtaining request is triggered by receiving, by the audio signal playing terminal, an information obtaining triggering instruction from the object associated with the audio signal playing terminal.

18. The audio signal playing terminal according to claim 14, wherein the sending an identification information obtaining request is triggered by determining, by the audio signal playing terminal, a change of a position of the audio signal playing terminal.

* * * * *